US012658197B2

(12) United States Patent (10) Patent No.: US 12,658,197 B2
Clark et al. (45) Date of Patent: Jun. 16, 2026

(54) NOISE SUPPRESSION CONTROLS

(71) Applicant: Hewlett-Packard Development Company, L.P., Spring, TX (US)

(72) Inventors: Alexander Wayne Clark, Spring, TX (US); Yun David Tang, Spring, TX (US); Maureen Ann Aragon, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 172 days.

(21) Appl. No.: 18/263,280

(22) PCT Filed: Feb. 26, 2021

(86) PCT No.: PCT/US2021/019869
§ 371 (c)(1),
(2) Date: Jul. 27, 2023

(87) PCT Pub. No.: WO2022/182356
PCT Pub. Date: Sep. 1, 2022

(65) Prior Publication Data
US 2024/0127839 A1 Apr. 18, 2024

(51) Int. Cl.
*G10L 21/0216* (2013.01)
*G06T 7/73* (2017.01)
(Continued)

(52) U.S. Cl.
CPC ............ *G10L 21/0216* (2013.01); *G06T 7/74* (2017.01); *G06V 10/764* (2022.01); *G06V 20/41* (2022.01);
(Continued)

(58) Field of Classification Search
CPC ....... G10L 2021/02087; G10L 21/0216; G06T 7/70; G06V 20/41; G06V 20/52; G06V 40/10
(Continued)

(56) References Cited

U.S. PATENT DOCUMENTS 10,469,830 B2 11/2019 Chan et al.
10,628,714 B2 4/2020 Pradeep et al.
(Continued)

FOREIGN PATENT DOCUMENTS

KR 10-2019-0078543 A 7/2019
TW 202044236 A 12/2020
(Continued)

OTHER PUBLICATIONS

Qian, Xinyuan, et al. "Multi-speaker tracking from an audiovisual sensing device." IEEE Transactions on Multimedia 21.10. Mar. 2019. pp. 1-15. (Year: 2019).*
(Continued)

*Primary Examiner* — James S Wozniak
(74) *Attorney, Agent, or Firm* — Quarles & Brady LLP

(57) ABSTRACT

Examples of noise suppression controls are described herein. In some examples, an electronic device includes a processor to classify, using a first machine learning model, an environment based on video of the environment to produce a classification. In some examples, the processor is to detect, using a second machine learning model, a situation in the environment based on the video to produce a detection. In some examples, the processor is to control noise suppression on audio captured from the environment based on the classification and the detection.

19 Claims, 6 Drawing Sheets

(51) Int. Cl.

| | |
|---|---|
| *G06V 10/764* | (2022.01) |
| *G06V 20/40* | (2022.01) |
| *G06V 20/52* | (2022.01) |
| *G06V 40/10* | (2022.01) |
| *G10L 21/0208* | (2013.01) |

(52) U.S. Cl.
CPC .... *G06V 20/52* (2022.01); *G06T 2207/20081* (2013.01); *G06T 2207/20084* (2013.01); *G06T 2207/30196* (2013.01); *G06V 40/10* (2022.01); *G10L 2021/02087* (2013.01); *G10L 2021/02163* (2013.01)

(58) Field of Classification Search
USPC .......................... 704/226; 381/94.1; 382/156
See application file for complete search history.

(56) References Cited

U.S. PATENT DOCUMENTS

| | | | | |
|---|---|---|---|---|
| 11,042,354 | B1* | 6/2021 | Candelore | H04R 3/00 |
| 11,176,923 | B1* | 11/2021 | Vendrow | G10K 11/17873 |
| 11,202,150 | B1* | 12/2021 | Hoover | G06V 40/10 |
| 2008/0069433 | A1* | 3/2008 | Corcoran | G06T 7/11 |
| | | | | 382/149 |
| 2014/0105407 | A1 | 4/2014 | Herger et al. | |
| 2015/0162000 | A1* | 6/2015 | Di Censo | G06F 16/9535 |
| | | | | 704/270.1 |
| 2016/0125879 | A1* | 5/2016 | Lovitt | G10L 17/00 |
| | | | | 704/275 |
| 2016/0284349 | A1 | 9/2016 | Ravindran et al. | |
| 2019/0102646 | A1* | 4/2019 | Redmon | G06V 20/20 |
| 2019/0172462 | A1 | 6/2019 | Mishra et al. | |

| | | | | |
|---|---|---|---|---|
| 2019/0220248 | A1* | 7/2019 | Cordourier Maruri | |
| | | | | G06F 3/167 |
| 2020/0004291 | A1* | 1/2020 | Wexler | G10L 15/10 |
| 2020/0241552 | A1* | 7/2020 | Leenayongwut | G01C 21/34 |
| 2020/0296521 | A1* | 9/2020 | Wexler | G06F 3/167 |
| 2020/0411030 | A1 | 12/2020 | Fazeli et al. | |
| 2021/0051397 | A1 | 2/2021 | Veselinovic et al. | |
| 2021/0099146 | A1* | 4/2021 | Lee | G06T 7/73 |
| 2021/0127204 | A1* | 4/2021 | Porta | G06N 20/20 |
| 2021/0334645 | A1* | 10/2021 | Pardeshi | G06N 3/045 |
| 2021/0350822 | A1* | 11/2021 | Liu | H04R 3/04 |
| 2021/0365707 | A1* | 11/2021 | Mao | H04N 23/80 |
| 2022/0021985 | A1* | 1/2022 | Wexler | G10L 25/51 |
| 2022/0050997 | A1* | 2/2022 | Meier | G06V 10/82 |
| 2022/0124417 | A1* | 4/2022 | Sun | H04N 21/4854 |
| 2022/0165292 | A1* | 5/2022 | Saki | G06N 5/04 |
| 2022/0172736 | A1* | 6/2022 | Wexler | G06V 20/10 |
| 2023/0045237 | A1* | 2/2023 | Wexler | G06V 40/20 |
| 2023/0104683 | A1* | 4/2023 | Recker | H04R 25/609 |
| | | | | 381/312 |
| 2023/0336694 | A1* | 10/2023 | Wexler | G10L 25/63 |

FOREIGN PATENT DOCUMENTS

| | | | | |
|---|---|---|---|---|
| WO | | 2019/132518 | A1 | 7/2019 |
| WO | | WO-2021138648 | A1* | 7/2021 ......... G10L 21/0364 |

OTHER PUBLICATIONS

Inbar Mosseri and Oran Lang; "Looking to Listen: Audio-Visual Speech Separation"; Google AI blog, Jan. 6, 2021, pp. 5.
Zoom out, "AROUND", miro LABS, Video calls loved by extraordinary teams, pp. 8.

* cited by examiner

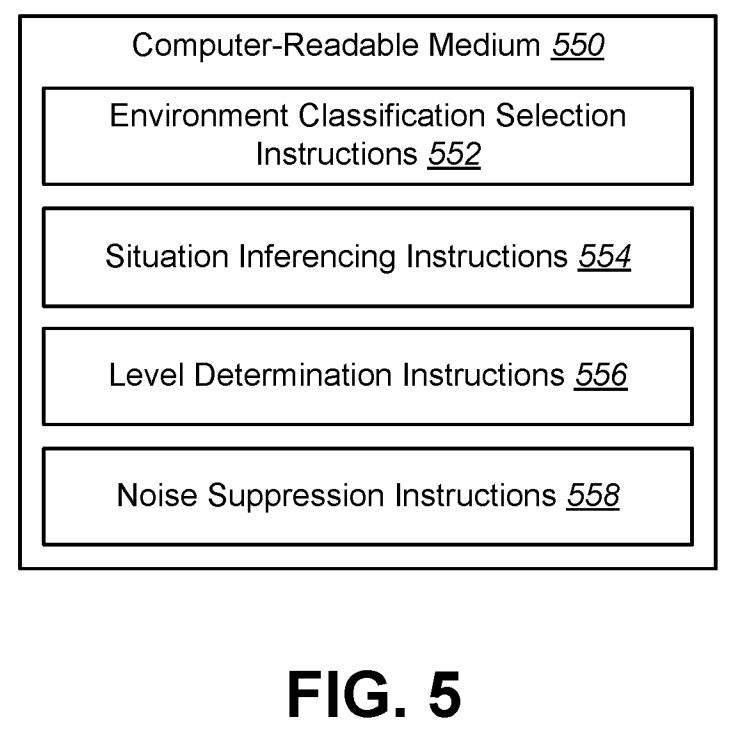

Computer-Readable Medium *550*

Environment Classification Selection Instructions *552*

Situation Inferencing Instructions *554*

Level Determination Instructions *556*

Noise Suppression Instructions *558*

FIG. 5

NOISE SUPPRESSION CONTROLS

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

BRIEF DESCRIPTION OF THE DRAWINGS

FIG. 5 is a block diagram illustrating an example of a computer-readable medium for noise suppression control;

DETAILED DESCRIPTION

Figure 1:
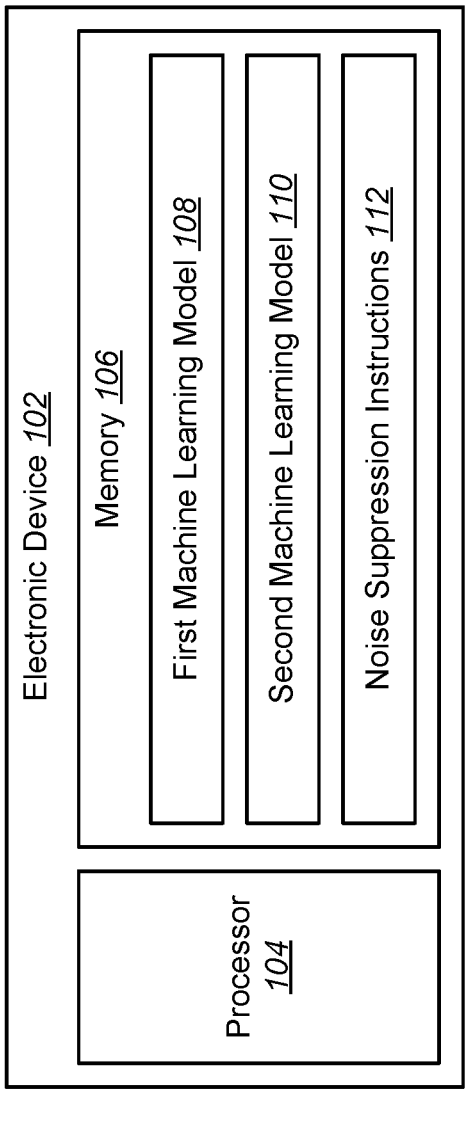
FIG. 1 is a block diagram of an example of an electronic device that may be used to control noise suppression.

Some examples of the techniques described herein may be related to noise suppression controls. For instance, some of the techniques described herein may include noise suppression based on an image or a video. Video may be image data. For example, a video may include a sequence of images (e.g., frames of pixel data) of a format. In some examples, a video may be produced with captured images (e.g., screen captures, image sensor captures, etc.). In some examples, digital video may be captured image data streamed through a mobile industry processor interface (MIPI), universal serial bus (USB), and/or other interface (e.g., digital media communication interface) from a camera to a computing device. For instance, a device (e.g., camera, sensor, apparatus, electronic device, and/or computing device, etc.) may capture and/or receive images of an environment. An environment may be a place. For instance, an environment may be a room, area, building, and/or space, etc.

In some examples, audio may be captured. For instance, a device (e.g., camera, microphone, apparatus, electronic device, and/or computing device, etc.) may capture and/or receive audio from the environment. In some examples, audio may be captured and/or encoded with video. For instance, video conferencing, video phone calls, video broadcasting, video recording, and/or video streaming may utilize video and/or audio captured from an environment. Some examples of the techniques described herein may be described in terms of video conferencing using a device and/or apparatus (e.g., personal computer (PC), smartphone, tablet device, etc.) and/or may be utilized in other contexts (e.g., video phone calls, video broadcasting, video recording, and/or video streaming, etc.).

For a device used for video conferencing, for example, it may be helpful to detect a source of noise and perform adaptive background noise suppression to reduce distraction. Some approaches may be used to suppress different types of sounds identified as noise. In some cases, inaccurate noise suppression may cause sound distortion.

Some examples of the techniques described herein may utilize machine learning. Machine learning may be a technique where a machine learning model may be trained to perform a task or tasks based on a set of examples (e.g., data). Training a machine learning model may include determining weights corresponding to structures of the machine learning model. In some examples, the machine learning model may include hyperparameter(s) (e.g., learning rate, batch size, number of hidden layers, and/or activation functions). Artificial neural networks may be a kind of machine learning model that may be structured with nodes, layers, and/or connections. Deep learning is a kind of machine learning that utilizes multiple layers. A deep neural network may be a neural network that utilizes deep learning.

Examples of neural networks may include convolutional neural networks (CNNs) (e.g., CNN, deconvolutional neural network, inception module, residual neural network, etc.) and recurrent neural networks (RNNs) (e.g., RNN, multilayer RNN, bi-directional RNN, fused RNN, clockwork RNN, etc.). For instance, some CNNs may be utilized for video and/or image-based detection. Some examples of RNNs may be utilized for audio-based inferencing and/or language processing. Different neural network depths may be utilized in accordance with some examples of the techniques described herein.

Some examples of the techniques described herein may utilize video and supervised machine learning for adaptive noise suppression. For instance, some approaches may perform actions based on a determined noise source and a spatial relationship of the noise source with a person (e.g., user) for enhanced audio quality when an object and/or event is detected.

In video conferencing (e.g., Zoom, Microsoft Teams, etc.) on a personal computer, for instance, a user-facing camera (e.g., web camera) may enable a user to interact with other meeting attendees. In some environments (e.g., home office, arbitrary environment, etc.), background noise may occur, which may cause a distraction and/or affect sound clarity in a meeting. In some approaches to noise suppression, a false positive may occur (which may result in removing or distorting sound), or a false negative may occur (which may result in failing to suppress noise).

Some examples of the techniques described herein may use an image and/or video using user-facing image sensor (e.g., camera). For example, video may be utilized with computer vision techniques to detect background objects (e.g., people, objects, and/or pets, etc.) and/or corresponding locations for selective noise suppression with enhanced confidence.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a block diagram of an example of an electronic device 102 that may be used to control noise suppression. An electronic device may be a device that includes electronic circuitry. Examples of the electronic device 102 may include a personal computer, a server computer, a smartphone, a tablet computer, etc. The electronic device 102 may include and/or may be coupled to a processor 104 and/or a memory 106. The electronic device 102 may include additional components (not shown) and/or some of the components described herein may be removed and/or modified without departing from the scope of this disclosure.

The processor 104 may be any of a central processing unit (CPU), a digital signal processor (DSP), a semiconductor-based microprocessor, graphics processing unit (GPU), field-programmable gate array (FPGA), an application-specific integrated circuit (ASIC), and/or other hardware device suitable for retrieval and execution of instructions stored in the memory 106. The processor 104 may fetch, decode, and/or execute instructions stored in the memory 106. In some examples, the processor 104 may include electronic circuitry that includes electronic components for performing an operation or operations of the instructions. In some examples, the processor 104 may perform one, some, or all of the aspects, operations, elements, etc., described in one, some, or all of FIG. 1-6.

The memory 106 may be an electronic, magnetic, optical, and/or other physical storage device that contains or stores electronic information (e.g., instructions and/or data). The memory 106 may be, for example, Random Access Memory (RAM), Electrically Erasable Programmable Read-Only Memory (EEPROM), a storage device, an optical disc, and/or the like. In some examples, the memory 106 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the memory 106 may be a non-transitory tangible machine-readable or computer-readable storage medium, where the term "non-transitory" does not encompass transitory propagating signals. In some examples, the memory 106 may include multiple devices (e.g., a RAM card and a solid-state drive (SSD)).

In some examples, the electronic device 102 may include a communication interface (not shown in FIG. 1) through which the processor 104 may communicate with an external device or devices (e.g., networked device(s), server(s), smartphone(s), microphone(s), camera(s), printer(s), computer(s), etc.). Some examples of communication interfaces may include Bluetooth, USB, MIPI, serial peripheral interface (SPI), etc. In some examples, a communication interface may operate through a processor's general purpose input/output (GPIO), inter-integrated circuit (I²C), etc., digital signal pin(s). In some examples, the electronic device 102 may be in communication with (e.g., coupled to, have a communication link with) a display device(s), microphone(s), and/or image sensor(s) (e.g., web camera(s)). In some examples, the electronic device 102 may include an integrated display panel(s), integrated image sensor(s), and/or integrated microphone(s).

The communication interface may include hardware and/or machine-readable instructions to enable the processor 104 to communicate with the external device or devices. The communication interface may enable a wired and/or wireless connection to the external device or devices. In some examples, the communication interface may include a network interface card and/or may also include hardware and/or machine-readable instructions to enable the processor 104 to communicate with various input and/or output devices. Examples of output devices include a display device(s), speaker(s), headphone(s), etc. Examples of input devices include a keyboard, a mouse, a touch screen, etc., through which a user may input instructions and/or data into the electronic device 102.

In some examples, the communication interface may send and/or receive video (e.g., video stream(s)). For instance, the communication interface may send and/or receive video of a virtual meeting, online meeting, video call, etc. In some examples, the video may depict a person or people and/or presentation materials. The electronic device 102 may store, receive, and/or transmit a video or videos (e.g., video stream(s)). In some examples, a video stream may be stored as a file for playback. In some examples, a video stream may be transmitted and/or received over a link (e.g., wired link, wireless link, network, etc.). For instance, a video stream may be provided over the Internet for a virtual meeting and/or virtual presentation. In some examples, video may be captured from a live presentation (e.g., in-class presentation, meeting room presentation, etc.).

In some examples, the memory 106 of the electronic device 102 may store a first machine learning model 108, a second machine learning model 110, and/or noise suppression instructions 112. The first machine learning model 108 may be data and/or instructions indicating a structure of a machine learning model. For instance, the first machine learning model 108 may indicate a layer or layers, a node or nodes, and/or a weight or weights. The second machine learning model 110 may be data and/or instructions indicating a structure of a machine learning model. For instance, the second machine learning model 110 may indicate a layer or layers, a node or nodes, and/or a weight or weights. In some examples, the first machine learning model 108 and the second machine learning model 110 may be separate (e.g., separate neural networks). In some examples, the first machine learning model 108 and the second machine learning model 110 may be combined into one machine learning model (e.g., one neural network). In some examples, the first machine learning model 108 and the second machine learning model 110 may be a two-stage deep convolution neural network. The first stage of the neural network may be used for environment classification. The second stage of the neural network may be trained through transferred learning (e.g., from a pet model and/or human detection model), and may be used for inferencing user, pet, and/or background activities.

In some examples, the first machine learning model 108 may be trained to classify an environment or place. For instance, the first machine learning model 108 may be trained with a set of training data (e.g., still images and/or video) of different environments. Examples of different environments may include offices, home offices, outdoors, airports, airplane interiors, laundromat, laundry room, café, bedroom, etc. The set of training data may be labeled to indicate the corresponding environments. During training, a loss function may be evaluated in reducing and/or minimizing the error of the objective function of the model to determine weight adjustments to enable the first machine learning model 108 to more accurately classify the environments depicted in the images and/or video. For example, to determine an office environment (including a home office environment, for instance), the model may be utilized for binary classification, where non-office images are labeled '0' and office images are labeled '1'. In some examples, a convolutional neural network (e.g., modified AlexNet or other CNN) may be used for the first machine learning model 108 for inferencing environment (e.g., office, home office, airplane interior, laundry room, etc.) In some examples, the first machine learning model 108 architecture may include 5 convolution layers, 1 flatten layer, 1 fully connected layer, and an output (e.g., softmax) layer. In some examples, a cross entropy loss function may be utilized for reducing and/or minimizing error for weight adjustment. The first machine learning model 108 may be trained on the electronic device 102 or on another device. For instance, the electronic device 102 (e.g., processor 104) may train the first machine learning model 108 and/or the electronic device 102 may receive a first machine learning model 108 that has been trained by another device.

In some examples, the processor 104 may execute the first machine learning model 108 to classify an environment based on video of the environment to produce a classification. For instance, the processor 104 may classify, using a first machine learning model 108, an environment based on video of the environment to produce a classification. In some examples, the video of the environment may be captured locally (e.g., the electronic device 102 may be located in the environment). For instance, the electronic device 102 may capture and/or receive the video from an image sensor (e.g., web camera) linked to the electronic device or integrated into the electronic device 102. In some examples, the electronic device 102 may receive video from a remote device. For instance, the electronic device 102 may be a server that receives video from a remote device (e.g., computer, tablet, smartphone, camera, etc.) over a network (e.g., Internet) link.

In some examples, the processor 104 may provide (e.g., input) the video or an image or images to the first machine learning model 108 to execute the first machine learning model 108. The first machine learning model 108 may produce a classification. A classification may be an indication of the environment of the video. In some examples, the classification may be probabilities (e.g., likelihoods) that the video corresponds to each of a set of environments. For instance, the first machine learning model 108 may produce a classification that indicates a percentage probability for each of an office, outdoors, and/or airport, etc. In some examples, the processor 104 may select or determine an environment with a greatest probability from the classification as the environment from which the video was captured.

In some examples, the processor 104 may determine a scenario based on the first machine learning model 108 (e.g., the classification produced by the first machine learning model 108). A scenario may be a setting and/or situation. A situation may be an object and/or activity (e.g., object(s) and/or activity(ies)). For instance, the processor 104 may determine whether the video indicates an office environment using the first machine learning model 108. If the classification indicates that the environment is not an office, the processor 104 may determine a non-office scenario (e.g., setting, a non-office place, etc.). For instance, the processor 104 may determine and/or select one of the non-office classifications (e.g., laundry room, airplane, etc.) with a greatest probability as the scenario.

In some examples, the processor 104 may detect (e.g., inference), using the second machine learning model 110, a situation in the environment based on the video to produce a detection. For instance, if the classification from the first machine learning model 108 indicates that an office environment has a greatest probability, the processor 104 may determine an office environment and may determine a situation (e.g., object(s) and/or activity(ies)) in the office environment using the second machine learning model 110. In some examples, the processor 104 may execute the second machine learning model 110 to detect a situation based on the video to produce the detection.

In some examples, the second machine learning model 110 may be trained to detect the situation. For instance, the second machine learning model 110 may be trained with a set of situation training images (e.g., still images and/or video) of different situations. Examples of situations may include the presence of a second person (e.g., a second person besides a person or user of the electronic device 102), an animal (e.g., pet), a child or children, etc. For instance, the second machine learning model 110 may be utilized to detect the entrance and/or exit of a second person(s) and/or the entrance and/or exit of an animal(s), etc. The set of situation training images may be labeled to indicate the corresponding situation. During training, a loss function (e.g., cross entropy loss function) may be evaluated to determine weight adjustments to enable the second machine learning model 110 to more accurately detect the situations depicted in the images and/or video.

The second machine learning model 110 may be trained on the electronic device 102 or on another device. For instance, the electronic device 102 (e.g., processor 104) may train the second machine learning model 110 and/or the electronic device 102 may receive a second machine learning model 110 that has been trained by another device.

In some examples, a dataset or datasets may be generated to train the first machine learning model 108 and/or the second machine learning model 110. For instance, the electronic device 102 (e.g., processor 104) or another device may perform data augmentation to augment an image or images with geometrical transformation(s) (e.g., rotation, pan-shifting, cropping, and/or flipping) and/or color shifting. For instance, data augmentation may be performed to generate a dataset that is a multiple of (e.g., 10×) the number of images in an original set of training images. In some examples, a proportion (e.g., 5%) of training images may be reserved as a test dataset for validating model runtime accuracy. In some examples, captured images of people, animals (e.g., pets) and/or objects with corresponding 2D locations may vary. Different locations may be utilized to verify the effectiveness of noise reduction as a microphone may receive foreground sound and/or background noise of different ratios due to relative angles of the sound sources to the microphone. In some examples, microphone sensitivity may vary based on direction of reception in accordance with a microphone directionality pattern.

In some examples, the second machine learning model 110 (e.g., neural network) may include 16-20 hidden layers structured as repeated sets of convolutional layers (e.g., 2, 3, 4, etc., convolutional layers) followed by a pooling layer. In some examples, convolutional layers may have an increasing kernel size from shallower layers to deeper layers (e.g., 3×3, to 5×5, to potentially larger, etc.) to train from smaller features to larger features in the deeper layers. In some examples, the second machine learning model 110 (e.g., network architecture) may have the last three layers structured with two fully-connected layers and one softmax layer (or more) for classifying multiple classes/categories.

In some examples for image-based object detection, an Inception model may be used for adaptive training and to enhance model performance and accuracy. For instance, an inception model may be used with kernels of 1×1, 3×3, and 5×5 of three convolutional layers and one pooling layer stacked in each layer.

In some examples, the processor 104 may provide (e.g., input) the video or an image or images to the second machine learning model 110 to execute the second machine learning model 110. The second machine learning model 110 may produce a detection. A detection may be an indication of the situation in the environment of the video.

In some examples, the detection may be probabilities (e.g., likelihoods) that the video corresponds to each of a set of situations. For instance, the second machine learning model 110 may produce a classification that indicates a percentage probability for each situation.

In some examples, deep learning may be utilized to detect different situations (e.g., activities and/or objects, such as a person, dog, and/or cat) in a single image. In some examples, the second machine learning model 110 (e.g., neural network model with multi-task learning) may share layers for detecting features at different feature levels (e.g., low-level to medium-level features, such as features of a person, animal, and/or object).

In some examples, the situation (e.g., the detected situation) may indicate a location relationship between a first person (e.g., user) and a second person, animal, and/or object. For instance, the second machine learning model 110 may be trained to detect situations where a person (e.g., user) has different location relationships with a second person, animal, and/or object. For instance, zones may be established relative to a camera. A zone may be a region, area, or space. For instance, a zone may be expressed as a region of an environment and/or a region in a captured image of the environment. For instance, a first zone may be nearer to the camera than a second zone.

In some examples, a first zone may be in a distance range ≤1 meter from the camera (in a field of view of the camera, for instance) and a second zone may be in a distance range >1 meter from the camera (in the field of view of the camera, for instance). In some examples, a first zone may be in a distance range of 0.5-1 meter from the camera and a second zone may be in a distance range ≥2 meters from the camera. In some examples, a zone or zones may be established at another distance or distances in the field of view of the camera.

In some examples, a location relationship may indicate a first case that a first person is in a first zone and a second person is in a second zone, a second case that the first person is in the first zone and an animal is in the second zone, a third case that the first person and the second person are in the first zone, or a fourth case that the first person and the animal are in the first zone, where the first zone is nearer to a camera than the second zone.

In some examples, detecting a person or object (e.g., child or pet) in a zone (e.g., foreground zone or background zone) and/or classifying an environment (e.g., a non-office or office environment) may be achieved with data labelling and model training. In some examples, nine categories of images captured from cameras may be labelled, for example, from index 1, 2, . . . to 9. Each category may include 1,000 images, and input into the second machine learning model 110 to generate weights for each layer (e.g., each layer in a neural network). Examples of the nine categories of situations are given as follows:

(1) A first person is alone in the scene, sitting 0.5-1 meter in a central portion (e.g., ±30 degrees from a central point) of a field of view of the camera.

(2) A first person is alone in the scene, more than 1.5 meters away from the camera.

(3) A first person is 0.5-1 meter in front of the camera, with a second person behind who is more than 1.5 meters away.

(4) A first person and a second person (e.g., child) are within a central portion of a field of view of the camera, and are at 0.5-1 meter from the camera.

(5) A first person is 0.5-1 meter in front of the camera, with a cat 2 meters away from the camera (e.g., in the background) in the field of view.

(6) A first person is 0.5-1 meter in front of the camera, with a dog 2 meters away from the camera (e.g., in the background) in the field of view.

(7) A first person is 0.5-1 meter in front of the camera, with a dog sitting on the first person's lap or at the first person's side.

(8) No person is visible in the field of view (e.g., a first person is away from the camera), with a dog or cat 2 meters away from the camera (e.g., in the background) in the field of view.

(9) A cat or a dog walks in and is halfway inside the field of view.

While nine categories of situations are provided in the foregoing example, more, fewer, and/or different categories of situations may be used in some examples for training and/or detection.

In some examples, the situation (e.g., the situation detected by the second machine learning model 110) may indicate a bounding box location for a person, animal, and/or object. For instance, the second machine learning model 110 may be trained to determine a bounding box location or locations for an object or objects (e.g., person(s), animal(s), other object(s), etc.) in an image or video. In some examples, the processor 104 may determine a location relationship by calculating a distance or distances of a bounding box or bounding boxes. For instance, the situation may indicate a first bounding box location of a first person and a second bounding box location of a second person or animal. The processor 104 may determine a location relationship by calculating a distance between the first bounding box location and the second bounding box location.

In some examples, the second machine learning model 110 (e.g., neural network) may be trained with labeled images for detecting multiple objects (e.g., person or persons and/or animal or animals) in the captured image(s) and/or video (e.g., image(s) and/or video captured in a home office environment). For instance, the training images may be labelled with different object classes: 1 for an adult, 2 for a child, 3 for a dog, 4 for a cat, and 0 for none (e.g., none of 1, 2, 3, or 4). The second machine learning model 110 (e.g., neural network) may be trained with multi-task learning. During runtime, the second machine learning model 110 may detect an object class or classes (e.g., 0, 1, 2, 3, and/or 4) and may generate a bounding box for each detected instance of an object class. In some examples, each bounding box may be located on the face of the detected person or animal, or on the body if a face is not completely visible in the image. In some examples, the processor 104 may determine and/or record information for each bounding box. For instance, the processor 104 may determine and/or record an object class, size, and/or two-dimensional (2D) location with four image points for each bounding box. In some examples, the information (e.g., object class, size, and/or 2D location with image points) may be used by the processor 104 to determine a distance (e.g., a distance vector) between a first person (e.g., user) and a second person, animal, and/or object. The distance may be an approximate and/or relative distance. For instance, the accuracy of the distance may depend on whether one frame or multiple frames (e.g., 1, 2, . . . , n) are used, whether camera focal length f is used, and/or whether a reference measure (e.g., mean facial length) is used. In some examples, for an average child the mean facial length may be reduced by 70% relative to an average adult. In some examples, the distance and an angle calculated from triangulation may be used by the processor 104 to further determine a noise suppression level (e.g., noise suppression ratio). An example of distance and/or angle determination is given in FIG. 6A-C.

In a case where a human face is not detected by the second machine learning model 110 (e.g., neural network) due to a person (e.g., second person) looking away (e.g., looking sideways or turning around), a bounding box of the person's torso may be used for estimating the distance. When a torso is used, the size ratio may be adjusted (e.g., adjusted to 3 times of the size of a facial bounding box). For estimating the distance from a person to an animal (e.g., a pet like a dog), another technique may be used based on the detected bounding box of the animal. For example, contour and/or blob detection may be utilized to refine the initial estimate of the detected animal, such that the 2D central location of the pet is calculated more accurately. In some examples, the size of a pet's head from the bounding box may be combined with the principal axis of the pet's body from a detected contour using principal component analysis (PCA). The relative distance between a person and a pet may depend on whether the pet is facing the camera or not.

The processor 104 may execute the noise suppression instructions 112 to control noise suppression in audio captured from the environment. In some examples, the audio of the environment may be captured locally (e.g., the electronic device 102 may be located in the environment). For instance, the electronic device 102 may capture and/or receive the audio from a microphone or microphones linked to the electronic device or integrated into the electronic device 102. In some examples, the electronic device 102 may receive audio from a remote device. For instance, the electronic device 102 may be a server that receives audio from a remote device (e.g., computer, tablet, smartphone, microphone, etc.) over a network (e.g., Internet) link.

In some examples, the processor 104 may control noise suppression on the audio captured from the environment based on the classification and/or the detection. For instance, the processor 104 may select a noise suppression level based on the classification and/or the detection.

A noise suppression level may be an amount and/or degree of noise suppression. For instance, a greater noise suppression level may reduce detected noise by a greater amount (e.g., magnitude) relative to a lesser noise suppression level. In some examples, a noise suppression level may be expressed as a percentage and/or ratio. For instance, a noise suppression level of 100% may attempt to remove all noise from an audio signal, a noise suppression level of 50% may attempt to reduce noise by approximately half, and a noise suppression level of 0% may pass an audio signal without performing noise suppression, etc. In some cases, a signal (e.g., a user's voice) may be cut and/or distorted if the signal is relatively close to the noise in terms of frequency and/or spectrum. Some examples of noise suppression may include stationary noise suppression, Weiner filtering, non-stationary noise suppression, etc. For instance, noise suppression may include performing frequency-based filtering, spectral subtraction, linear time invariant (LTI) filtering, machine learning (e.g., artificial intelligence) based noise suppression, and/or beamforming (with a multi-microphone array, for instance), etc.

In some examples, the processor 104 may control noise suppression by mapping noise suppression levels to different environments, scenarios, and/or situations. For instance, noisier environments, scenarios, and/or situations may be mapped to greater noise suppression levels and/or quieter environments, scenarios, and/or situations may be mapped to lesser noise suppression levels. In an example, an environment may be classified as an office, and a situation may be detected as a first case where the first person is in a first zone and the second person is in a second zone, a second case where the first person is in the first zone and the animal is in the second zone, a third case where the first person and the second person are in the first zone, or a fourth case where the first person and the animal are in the first zone, where the first zone is nearer to a camera than the second zone. In some examples, the processor 104 may control the noise suppression to a first noise suppression level (e.g., 100%) for the first case or the second, or to a second noise suppression level (e.g., 0%) for the third case or the fourth case, where the first noise suppression level is greater than the second noise suppression level.

In some examples, the processor 104 may utilize the second machine learning model 110 to detect situations (e.g., changing situations) over time. For instance, the processor 104 may detect, using the second machine learning model 110, a second situation after a situation (e.g., first situation or previous situation), where the second situation indicates that a first person (e.g., user) is alone. For instance, after a situation in which the first person and the second person or animal are in different zones (e.g., the first case or second case described above), the processor 104 may detect that the second person or animal has left. The processor 104 may control the noise suppression to a third noise suppression level (e.g., 50%) that is between the first noise suppression level (e.g., 100%, 80%, etc.) and the second noise suppression level (e.g., 0%) in response to detecting the second situation after the situation (e.g., first situation or previous situation).

In some examples, the processor 104 may control the noise suppression based on a distance. For instance, the processor 104 may control the noise suppression based on a distance between a first bounding box of a first person and a second bounding box of a second person, animal, and/or object. For example, a first noise suppression level (e.g., 100%, 80%, etc.) may be used for a distance in a range of 1-2 meters, a second noise suppression level (e.g., 0%) may be used for a distance of <1 meter (and/or >4 meters), and a third noise suppression level (e.g., 50%) may be used for a distance between 2 and 4 meters, etc.

Performing noise suppression on the audio may produce noise-suppressed audio (e.g., a noise-suppressed audio signal). The electronic device 102 may store the noise-suppressed audio, send the noise-suppressed audio to another device (e.g., to a remote device via the Internet, to a device of another user in an online meeting, etc.), and/or may playback the noise-suppressed audio on a speaker or speakers (e.g., linked speaker(s), headphones, integrated speaker(s), etc.).

Some examples of the techniques described herein may be utilized to control noise suppression based on environment classification and/or scenario detection. For instance, environment classification and/or scenario detection with machine learning may be utilized to provide noise suppression for video and/or audio conferencing. Vision-assisted noise suppression may provide enhanced detection of the noise source, as images may include more information for predicting with machine learning model training. For instance, adaptive and/or selective noise suppression may be performed, where a vision-assisted mode may enhance performance for difficult cases. In some examples, quantitative noise suppression may be provided based on the location and/or distance of a person relative to a camera (e.g., electronic device). In some examples, a machine learning model or models (e.g., deep neural network) may be trained for multi-task learning for adults, children, animals (e.g., pets), objects, and/or activities.

Figure 2:
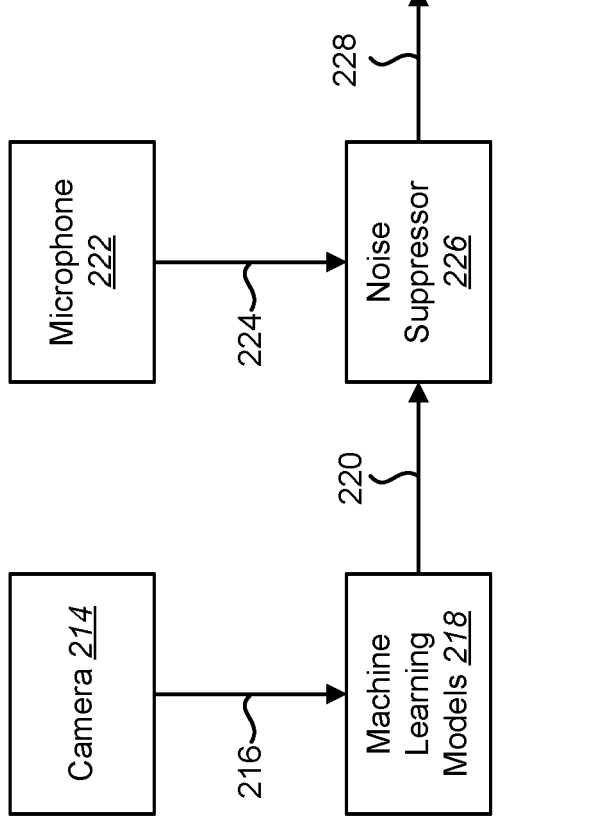
FIG. 2 is a block diagram illustrating examples of components and/or elements for noise suppression control.
Figure 2:
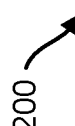

FIG. 2 is a block diagram illustrating examples of components and/or elements 200 for noise suppression control. In some examples, the components and/or elements 200 may perform an aspect or aspects of the operations described in FIG. 1. In some examples, the components and/or elements 200 may be included in and/or performed by an electronic device and/or an apparatus (e.g., electronic device 102, computing device, server, smartphone, laptop computer, tablet device, etc.). For example, the components and/or elements 200 may be included in and/or performed by the apparatus 430 described in FIG. 4. In some examples, one, some, or all of the components and/or elements 200 may be structured in hardware, circuitry and/or in a processor(s) with instructions. In some examples, the components and/or elements 200 may perform one, some, or all of the operations described in FIG. 1-6.

A camera 214 may capture video 216. For instance, the video 216 may be captured at a frame rate and resolution. The video may depict an environment, scenario, and/or situation. For instance, the video may depict a person (e.g., user) and/or a second person, animal, and/or object. In some examples, the video 216 may be captured locally (e.g., by a local device) or remotely (e.g., by a remote device). The video 216 may be provided to machine learning models 218 (e.g., the first machine learning model 108 and/or second machine learning model 110 described in FIG. 1, neural network(s), etc.).

The machine learning models 218 may classify the environment and/or detect a scenario (e.g., situation) based on the video 216 to produce classification data 220. For example, the machine learning models 218 (e.g., the first machine learning model 108) may determine whether video 216 from the camera 214 indicates an office (e.g., an office environment). The machine learning models 218 (e.g., the second machine learning model 110) may determine a scenario in response to determining whether the video indicates an office. The classification data 220 may indicate an environment classification and/or a detected scenario (e.g., situation). The classification data 220 may be provided to noise suppressor 226.

A microphone 222 may capture an audio signal 224. For instance, the microphone 222 may capture an audio signal 224 from the environment depicted in the video 216. The audio signal 224 may include voice signal(s) and/or noise signal(s). For instance, the audio signal 224 may indicate a user's voice and/or background noise. In some examples, the audio signal 224 may be captured locally (e.g., by a local device) or remotely (e.g., by a remote device). The audio signal 224 may be provided to the noise suppressor 226.

The noise suppressor 226 may perform noise suppression on the audio signal 224 based on the classification data 220 (e.g., classified environment and/or determined scenario). For instance, the noise suppressor 226 may determine a level of noise suppression based on the scenario. The noise suppressor 226 may process the audio signal 224 from the microphone 222 at the level of noise suppression. For instance, the noise suppressor 226 may execute a determined noise suppression level on the audio signal 224. Processing the audio signal 224 may produce a noise-suppressed audio signal 228. In a case of 0% noise suppression, the noise-suppressed audio signal 228 may be the same as or similar to the audio signal 224. The noise-suppressed audio signal 228 may be stored, sent to a remote device (e.g., a remote computer, server, smartphone, tablet, etc.), and/or may be provided to a speaker or speakers (e.g., headphones).

Figure 3:
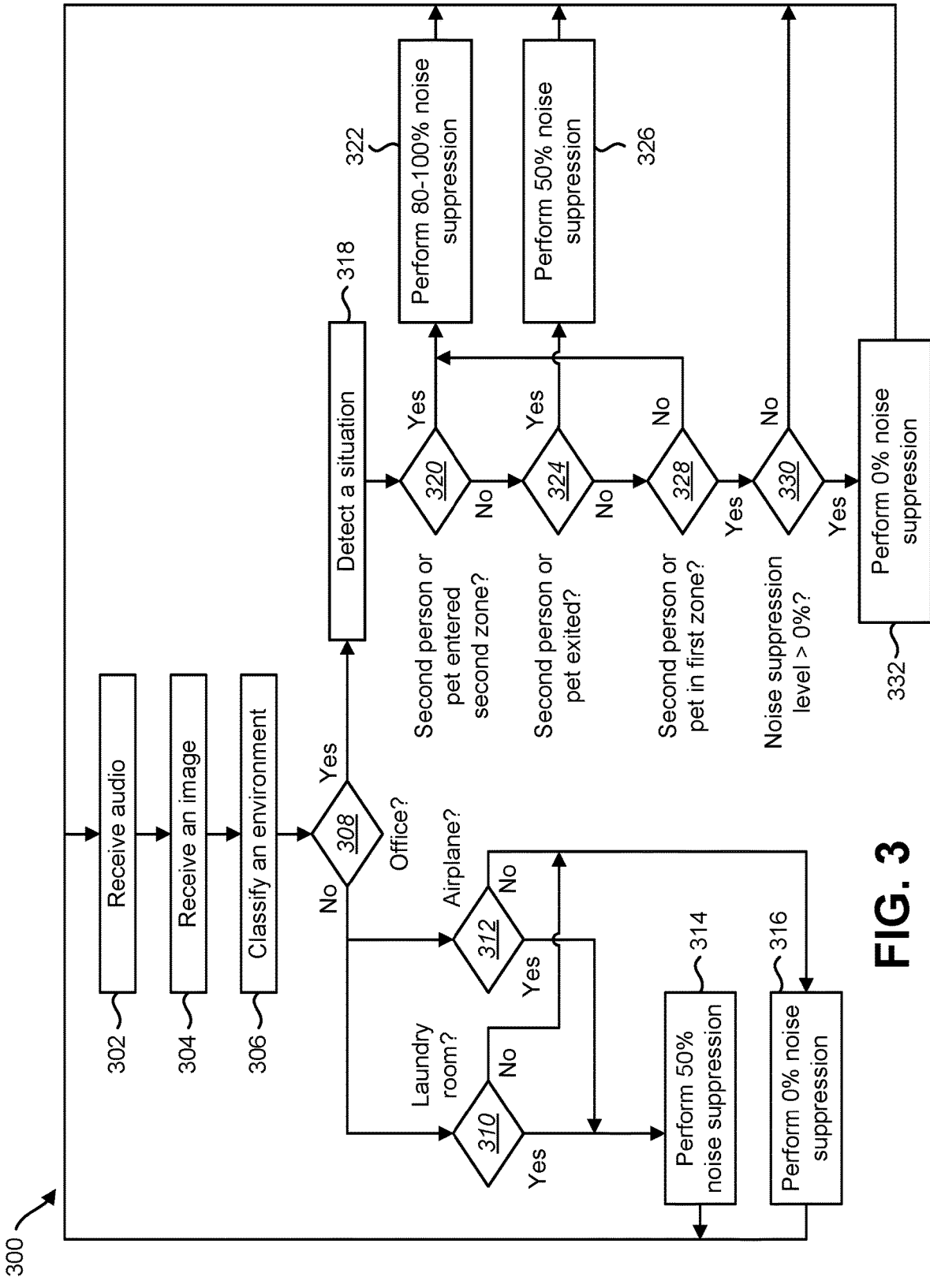
FIG. 3 is a flow diagram illustrating an example of a method for noise suppression control.

FIG. 3 is a flow diagram illustrating an example of a method 300 for noise suppression control. The method 300 and/or a method 300 element or elements may be performed by an electronic device and/or apparatus (e.g., electronic device 102, apparatus 430, computing device, server, etc.). For example, the method 300 may be performed by the electronic device 102 described in FIG. 1 and/or the apparatus 430 described in FIG. 4. Some examples of the method 300 may use machine learning (e.g., computer vision) to assist noise suppression with contextual object/activity detection.

At 302, an apparatus may receive audio. For example, the apparatus may capture and/or receive audio from a microphone and/or from a remote device. In some examples, receiving audio may be performed as described in FIG. 1 and/or FIG. 2. In some examples, the audio may be received in an online meeting or conference (from an enabled microphone, for instance).

At 304, the apparatus may receive an image. For example, the apparatus may capture and/or receive an image (e.g., image(s), video, etc.) from a camera and/or from a remote device. In some examples, receiving an image may be performed as described in FIG. 1 and/or FIG. 2. In some examples, the image may be received 304 in an online meeting or conference (from an enabled user-facing camera, for instance). In some examples, the audio and the image may correspond to a same environment and/or may be captured within a time frame (e.g., within 10 milliseconds (ms), 50 ms, 1 second, 5 seconds, 10 seconds, 1 minute, etc.) from each other. In some examples, the audio and the image may be encoded and/or received together in a video stream. In some examples, the audio and the image may be encoded and/or received separately.

At 306, the apparatus may classify an environment. For example, the apparatus may classify an environment depicted in the image using a first machine learning model. In some examples, classifying the environment may be performed as described in FIG. 1 and/or FIG. 2.

At 308, the apparatus may determine whether the environment is an office. For instance, the apparatus may determine whether an environment with a greatest probability from the classification is an office. In some examples, apparatus classifies the environment from the image into two categories (e.g., two or more categories), including office (e.g., commercial office or home office) or non-office. For an office environment, run-time detection from a second machine learning model (e.g., trained neural network) may be performed to handle various situations for noise suppression during a conference meeting in some examples. For a non-office category, noise suppression may be set at a 50% default noise suppression level or may depend on further classification (e.g., scenario and/or setting determination) as described in accordance with the method 300. For a classified non-office environment, for instance, noise suppression may be controlled through scenario (e.g., setting) determination from vision-based classification.

In a case that the environment is determined to not be an office, the apparatus may determine a scenario (e.g., setting). In some examples, the apparatus may determine whether the environment is a laundry room at 310 and/or may determine whether the environment is an airplane at 312. For instance, the apparatus may determine (e.g., infer) whether the environment is a laundry room and may determine (e.g., infer) whether the environment is an airplane in parallel (e.g., concurrently) or in a sequence. In some examples, the apparatus may determine whether a greatest probability from the classification is a laundry room. In a case that the scenario (e.g., setting) is determined to be a laundry room, the apparatus may perform 50% noise suppression at 314. For instance, the apparatus may select a 50% noise suppression level and perform noise suppression in accordance with the 50% noise suppression level. For example, when the apparatus determines that a user with a laptop is sitting in a laundry room (e.g., based on the detection of a washing machine and/or the classification of "laundry room"), the apparatus may perform 50% noise suppression. In some examples, operation may return to receiving audio at 302 and receiving an image (e.g., receiving subsequent audio and/or a subsequent image) at 304, etc.

At 312, the apparatus may determine whether the environment is an airplane. For instance, the apparatus may determine whether a greatest probability from the classification is an airplane (e.g., passenger cabin). In a case that the scenario (e.g., setting) is determined to be an airplane, the apparatus may perform 50% noise suppression at 314. For instance, when the apparatus detects a user sitting in a seat on an airplane (e.g., based on the recognition of an airplane cabin as background and/or a classification of "on airplane"), the apparatus may perform 50% noise suppression.

While some examples of non-office scenarios are described herein, other (e.g., more, fewer, and/or different) scenarios may be supported in some examples. For instance, if the apparatus determines that a user is sitting in a hotel lounge (based on the recognition of hotel as background and/or classification of "in hotel public area"), the apparatus may perform 50% noise suppression.

In a case that the scenario (e.g., setting) is determined to not be a laundry room and/or an airplane, the apparatus may perform 0% noise suppression at 316. For instance, the apparatus may select a 0% noise suppression level (e.g., no noise suppression) and not perform noise suppression (e.g., stop performing noise suppression or continue without performing noise suppression). In some examples, operation may return to receiving audio at 302 and receiving an image (e.g., receiving subsequent audio and/or a subsequent image) at 304, etc.

In a case that the environment is determined to be an office, the apparatus may detect a situation (e.g., person, animal, object, and/or activity) at 318. For example, the apparatus may detect a situation depicted in the image using a second machine learning model. In some examples, detecting the situation may be performed as described in FIG. 1 and/or FIG. 2.

In some examples, the apparatus may determine whether a second person or pet has entered a second zone at 320. In some examples, determining whether a second person or pet has entered the second zone may be performed as described in FIG. 1 and/or FIG. 2. For instance, the apparatus may determine whether a second person or pet is detected in the second zone after the second person or pet was not previously detected in the second zone (for a period, for example). In some examples, the apparatus may determine whether a greatest probability from the detection (e.g., inference) is a situation (among trained classes or categories as described herein, for instance) where a second person (e.g., adult or child) or pet is in the second zone, where the second zone is a zone that is farther from the camera than a first zone. In some examples, the apparatus may determine whether a calculated distance between bounding boxes (of a first person and of a second person or pet) indicates that the second person or pet is in the second zone. For instance, the apparatus may compare the distance to a threshold (e.g., 1 meter). If the distance satisfies (e.g., is greater than) the threshold, the apparatus may determine that the second person or pet is in the second zone. If the distance does not satisfy (e.g., is less than or equal to the threshold), the apparatus may determine that the second person or pet is not in the second zone.

In a case that the apparatus determines that a second person or pet has entered the second zone, the apparatus may perform 80-100% noise suppression at 322. For instance, the apparatus may select an 80-100% noise suppression level and perform noise suppression in accordance with the 80-100% noise suppression level. For instance, the noise suppression level may be selected within 80% to 100% depending on whether an adult second person has entered the second zone, whether a child second person has entered the second zone, and/or whether a kind of pet (e.g., dog or cat) that has entered the second zone, etc. In some examples, when a second person (e.g., child) walks into the field of view of the camera, the method 300 may include detecting the child as a second person in the background, and the apparatus may enter a noise suppression mode (e.g., 80-100% noise suppression). In some examples, when a dog or a cat walks into the field of view of the camera and passes a size threshold for a distance, the apparatus may detect the dog or cat as a pet in the background, and the apparatus may enter a noise suppression mode (e.g., 80-100% noise suppression). In some examples, operation may return to receiving audio at 302 and receiving an image (e.g., receiving subsequent audio and/or a subsequent image) at 304, etc.

In a case that the apparatus determines that a second person or pet has not entered the second zone (e.g., that no additional entry is detected since a previous situation detection), the apparatus may determine whether a second person or pet has exited (e.g., exited a field of view, exited the image, etc.) at 324. In some examples, determining whether a second person or pet has exited may be performed as described in FIG. 1 and/or FIG. 2. For instance, the apparatus may determine whether a second person or pet is not detected in the field of view or image after the second person or pet was previously detected in the field of view or image (for a period, for example). In some examples, the apparatus may determine whether a greatest probability from the detection (e.g., inference) is a situation (e.g., class and/or category) where a second person (e.g., adult or child) or pet is not in a field of view. In some examples, the apparatus may determine whether a bounding box for a second person or pet is not detected (e.g., no longer detected).

In a case that the apparatus determines that a second person or pet has exited the field of view or image, the apparatus may perform 50% noise suppression at 326. For instance, the apparatus may select a 50% noise suppression level and perform noise suppression in accordance with the 50% noise suppression level. In some examples, if noise suppression is enabled, when a second person or pet is no longer detected within the field of view of the camera, the apparatus may detect no background person or pet, and may enter 50% noise suppression. In some examples, operation may return to receiving audio at 302 and receiving an image (e.g., receiving subsequent audio and/or a subsequent image) at 304, etc.

In case that the apparatus determines that a second person or pet has not exited, the apparatus may determine whether a second person or pet is in a first zone at 328. In some examples, determining whether a second person or pet is in the first zone may be performed as described in FIG. 1 and/or FIG. 2. For instance, the apparatus may determine whether a second person or pet is detected in the first zone.

In some examples, the apparatus may determine whether a greatest probability from the detection (e.g., inference) is a situation where a second person (e.g., adult or child) or pet is in the first zone. In some examples, the apparatus may determine whether a distance between bounding boxes (of a first person and of a second person or pet) indicates that the second person or pet is in the first zone. For instance, the apparatus may compare the distance to a threshold (e.g., 1 meter). If the distance satisfies (e.g., is less than or equal to) the threshold, the apparatus may determine that the second person or pet is in the first zone. If the distance does not satisfy (e.g., is greater than the threshold), the apparatus may determine that the second person or pet is not in the first zone.

In a case that the apparatus determines that a second person or pet is not in the first zone, the apparatus may perform 80-100% noise suppression at 322. For instance, the apparatus may select an 80-100% noise suppression level and perform noise suppression in accordance with the 80-100% noise suppression level. For instance, the noise suppression level may be selected within 80% to 100% depending on whether an adult second person has remained in the second zone, whether a child second person has remained in the second zone, a kind of pet (e.g., dog or cat) that has remained in the second zone, and/or a kind of activity that is detected (e.g., talking on a smartphone, yelling, singing, barking, etc.). In some examples, operation may return to receiving audio at 302 and receiving an image (e.g., receiving subsequent audio and/or a subsequent image) at 304, etc.

In a case that the apparatus determines that a second person or pet is in the first zone, the apparatus may determine whether the noise suppression level is greater than 0% (e.g., whether another noise suppression level other than 0% is being used) at 330. In some examples, when a second person walks closer to the camera (e.g., appearing in a central portion of an image 0.5-1 meter in front of the camera), the apparatus may detect the second person as in front of camera, and the apparatus may leave noise suppression mode (e.g., use 0% noise suppression or stop noise suppression). In some examples, when a dog or cat walks closer and sits on the lap of the first person (e.g., user), the apparatus may detect the dog or cat as a "pet on lap," and the apparatus may leave noise suppression mode (e.g., use 0% noise suppression or stop noise suppression). In a case that the apparatus determines that the noise suppression level is not greater than 0% (e.g., 0% noise suppression is being used), operation may return to receiving audio at 302 and receiving an image (e.g., receiving subsequent audio and/or a subsequent image) at 304, etc.

In a case that the apparatus determines that a noise suppression level is greater than 0% (e.g., a noise suppression level greater than 0% or that noise suppression is being used), the apparatus may perform 0% noise suppression at 332. For instance, the apparatus may select a 0% noise suppression level and/or stop performing noise suppression (e.g., switch to a non-suppression mode). In some examples, operation may return to receiving audio at 302 and receiving an image (e.g., receiving subsequent audio and/or a subsequent image) at 304, etc.

While some examples of noise suppression levels are given herein, other (e.g., more, fewer, and/or different) noise suppression levels may be used in some examples. For instance, 10%, 55%, 72%, etc., and/or other noise suppression levels may be utilized in some examples. In some examples, the apparatus may store, send, and/or output the noise suppressed audio. In some examples, the apparatus may store, send, and/or output (e.g., output with the video) an indicator (e.g., text indicator, visual symbol, etc.) indicating an environment classification, a detected object or objects (e.g., first person, second person, third person, animal(s), child, children, etc.), whether noise suppression is being used, and/or a noise suppression level.

In some examples, an element or elements of the method 300 may be omitted or combined. In some examples, the method 300 may include one, some, or all of the operations, elements, etc., described in any of FIG. 1-6.

Figure 4:
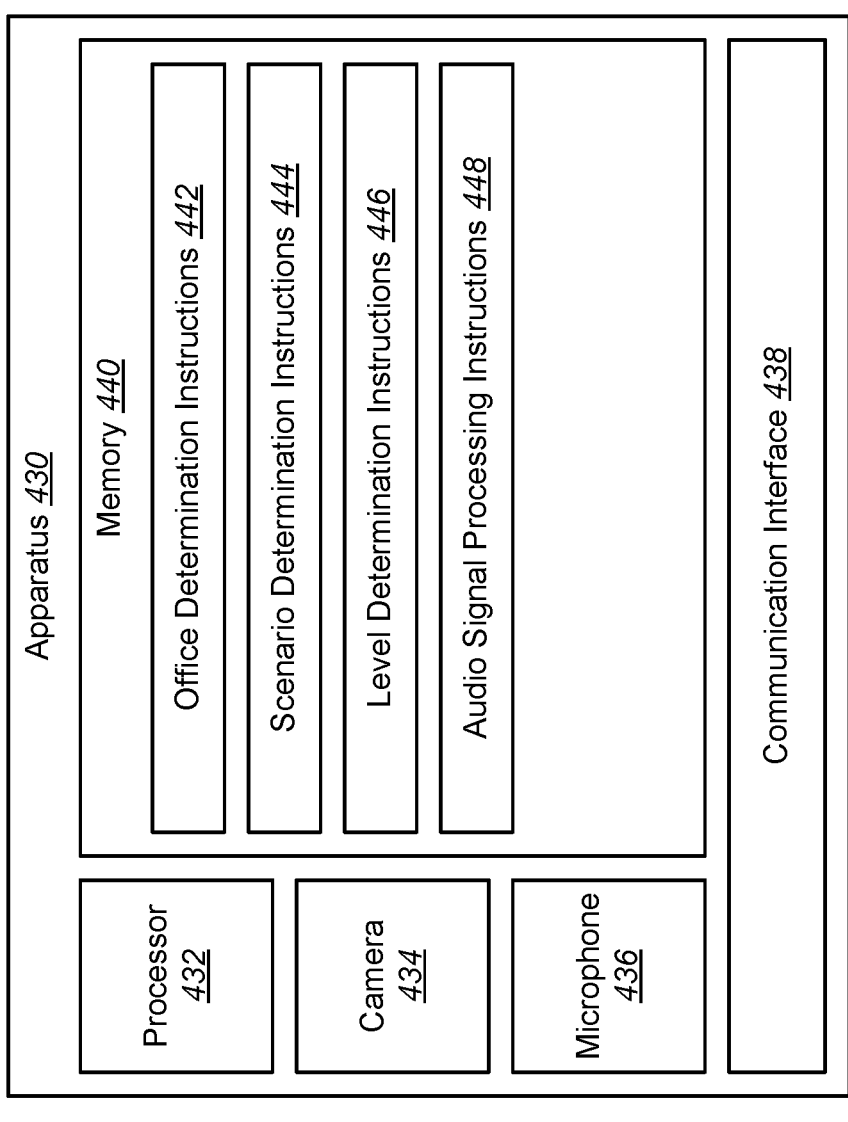
FIG. 4 is a block diagram of an example of an apparatus that may be used in noise suppression control.

FIG. 4 is a block diagram of an example of an apparatus 430 that may be used in noise suppression control. The apparatus 430 may be an electronic device, such as a personal computer, a server computer, a smartphone, a tablet computer, etc. The apparatus 430 may include and/or may be coupled to a processor 432 and/or a memory 440. In some examples, the apparatus 430 may include and/or may be coupled to a camera 434 and/or a microphone 436. In some examples, a camera 434 and/or microphone 436 may be integrated into the apparatus 430. In some examples, a camera 434 and/or microphone 436 may be separate from and/or linked to (e.g., in communication with) the apparatus 430. For instance, the camera 434 may be a separate web camera attached to the apparatus 430. The microphone 436 may be a separate device attached to the apparatus 430. The apparatus 430 may include additional components (not shown) and/or some of the components described herein may be removed and/or modified without departing from the scope of this disclosure. In some examples, the apparatus 430 may include memory 440 (e.g., non-volatile storage and/or volatile memory), a clock, and/or a graphics card with a graphic processor unit, etc. For instance, the apparatus may include a built-in user-facing camera 434, a speaker (not shown), and a microphone 436 for video conferencing. In some examples, the camera 434 may be a user-facing color camera with a resolution and a frame rate to support detecting a human and/or an animal in an environment (e.g., video conference environment, in a home, in an office, at a public area like a lounge, on an airplane, etc.).

In some examples, the apparatus 430 may be an example of the electronic device 102 described in FIG. 1. For instance, the processor 432 and/or memory 440 may be respective examples of the processor 104 and/or memory 106 described in FIG. 1. In some examples, the processor 432 may perform one, some, or all of the aspects, operations, elements, etc., described in one, some, or all of FIG. 1-6. In some examples, the apparatus 430 may provide contextual awareness for enhanced video and/or audio conferencing using machine learning-based optical object detection and/or vision-assisted audio processing.

In some examples, the apparatus 430 may include a communication interface 438 through which the processor 432 may communicate with an external device or devices (e.g., networked device, server, smartphone, etc.). In some examples, the apparatus 430 may be in communication with (e.g., coupled to, have a communication link with) a display device and/or an image sensor (e.g., the camera 434 and/or an image sensor on a remote device). In some examples, the apparatus 430 may include an integrated display panel.

The communication interface 438 may include hardware and/or machine-readable instructions to enable the processor 432 to communicate with the external device or devices. The communication interface 438 may enable a wired and/or wireless connection to the external device or devices. In some examples, the communication interface 438 may include a network interface card and/or may also include hardware and/or machine-readable instructions to enable the processor 432 to communicate with various input and/or output devices. Examples of output devices include a display device, speakers, etc. Examples of input devices include a keyboard, a mouse, a touch screen, etc., through which a user may input instructions and/or data into the apparatus 430. In some examples, the communication interface 438 may send and/or receive video. For instance, the communication interface may send and/or receive video of a virtual meeting.

In some examples, the memory 440 of the apparatus 430 may store office determination instructions 442, scenario determination instructions 444, level determination instructions 446, and/or audio signal processing instructions 448. In some examples, the memory 440 may include other data and/or instructions. For instance, the memory 440 may include data representing video and/or audio. For example, the memory 440 may include data that indicates an image or images (e.g., video stream data, video frame(s), still image(s), etc.) and/or an audio signal or signals (e.g., audio stream data, audio frame(s), etc.). In some examples, the memory 440 may include data representing classifications, detections, bounding box locations, bounding box sizes, distances (e.g., distance(s) between bounding boxes, distance(s) of objects in bounding boxes from a camera or another location, etc.), etc.

The office determination instructions 442 may be instructions to determine whether video from the camera 434 indicates an office using a first machine learning model. In some examples, the processor 432 may determine whether video from the camera indicates an office using a first machine learning model as described in FIG. 1, FIG. 2, and/or FIG. 3. In some examples, the first machine learning model may be a deep neural network model that is trained for inferencing office environment like a cubicle, home office, and/or for recognizing non-office locations like a laundromat, airplane cabin, etc.

The scenario determination instructions 444 may be instructions to determine a scenario in response to determining whether the video indicates an office. In some examples, the processor 432 may determine a scenario in response to determining whether the video indicates an office as described in FIG. 1, FIG. 2, and/or FIG. 3. For instance, if the processor 432 determines that the video indicates an office, the processor 432 may determine an office scenario (e.g., situation, object, and/or activity, etc.). For example, the processor may determine the scenario using a second machine learning model in response to determining that the video indicates an office. In some examples, the second machine learning model may be a deep neural network model that is trained for inferencing a first person (e.g., user), a second person and/or more persons (e.g., children), and/or pet activities, etc. If the processor 432 determines that the video does not indicate an office, the processor 432 may determine a non-office scenario (e.g., setting, a non-office place, etc.). For instance, the processor 432 may determine a non-office setting in response to determining that the video does not indicate an office.

The level determination instructions 446 may be instructions to determine a level of noise suppression based on the scenario. In some examples, the processor 432 may determine the level of noise suppression as described in FIG. 1, FIG. 2, and/or FIG. 3.

The audio signal processing instructions 448 may be instructions to process an audio signal from the microphone 436 at the level of noise suppression. In some examples, the processor 432 may processor the audio signal from the microphone 436 as described in FIG. 1, FIG. 2, and/or FIG.

3. In some examples, the level determination instructions 446 and/or audio signal processing instructions may provide an audio service (e.g., application) that is running in the background to detect background noise, and may use the office determination and/or scenario determination to perform noise suppression (e.g., determining the ratio of noise suppression or reverting back to a non-suppression mode). In some examples, a vision-assisted noise suppression mode may be initially disabled in an online meeting. The processor 432 may detect background noise and prompts a user to enable a vision-assisted noise suppression mode (which may use the environment classification and/or scenario determination described herein) to handle the background noise. A non-vision-assisted noise suppression mode may perform noise suppression without using an image (e.g., video) input.

FIG. 5 is a block diagram illustrating an example of a computer-readable medium 550 for noise suppression control. The computer-readable medium 550 is a non-transitory, tangible computer-readable medium, where the term "non-transitory" does not encompass transitory propagating signals. The computer-readable medium 550 may be, for example, RAM, EEPROM, a storage device, an optical disc, and/or the like. In some examples, the computer-readable medium 550 may be volatile and/or non-volatile memory, such as DRAM, EEPROM, MRAM, PCRAM, memristor, flash memory, and/or the like. In some examples, the memory 440 described in FIG. 4 may be an example of the computer-readable medium 550 described in FIG. 5.

The computer-readable medium 550 may include code (e.g., data and/or instructions). For example, the computer-readable medium 550 may include environment classification selection instructions 552, situation inferencing instructions 554, level determination instructions 556, and/or noise suppression instructions 558.

The environment classification selection instructions 552 may include instructions when executed cause a processor of an electronic device to select, using a first machine learning model and an image, an environment from a set of environments that includes an office environment and a non-office environment. In some examples, the environment may be selected as described in FIG. 1, FIG. 2, FIG. 3, and/or FIG. 4. For example, the set of environments may include an office environment and a non-office environment or environments (e.g., laundromat, airport, airplane cabin, outdoors, etc.). The processor may select an environment with a highest probability of a classification produced by the first machine learning model based on the image.

The situation inferencing instructions 554 may include instructions when executed cause the processor to infer, using a second machine learning model, a situation in the environment in response to the selection. For instance, the situation inferencing instructions 554 may include instructions when executed cause the processor of the electronic device to infer the situation from a set of situations that includes a first situation where a first person is in the first zone and an animal is in a second zone, a second situation where the first person and the animal are in a first zone, and a third situation where the animal is partially within a field of view, where the first zone is nearer to a camera than the second zone. In some examples, the situation may be inferred as described in FIG. 1, FIG. 2, FIG. 3, and/or FIG. 4.

The level determination instructions 556 may include instructions when executed cause the processor to determine a noise suppression level based on the situation (e.g., the environment and the situation). For instance, the level determination instructions 556 may include instructions when executed cause the processor of the electronic device to determine a first noise suppression level for the first situation, a second noise suppression level for the second situation, and a third noise suppression level for the third situation, where the first noise suppression level is lower than the second noise suppression level, and where the third noise suppression level is between the first noise suppression level and the second noise suppression level. In some examples, determining the noise suppression level may be performed as described in FIG. 1, FIG. 2, FIG. 3, and/or FIG. 4.

The noise suppression instructions 558 may include instructions when executed cause the processor to perform noise suppression on an audio signal captured from the environment based on the noise suppression level. In some examples, performing noise suppression on the audio signal may be performed as described in FIG. 1, FIG. 2, FIG. 3, and/or FIG. 4.

Figures 6A, 6B, 6C:
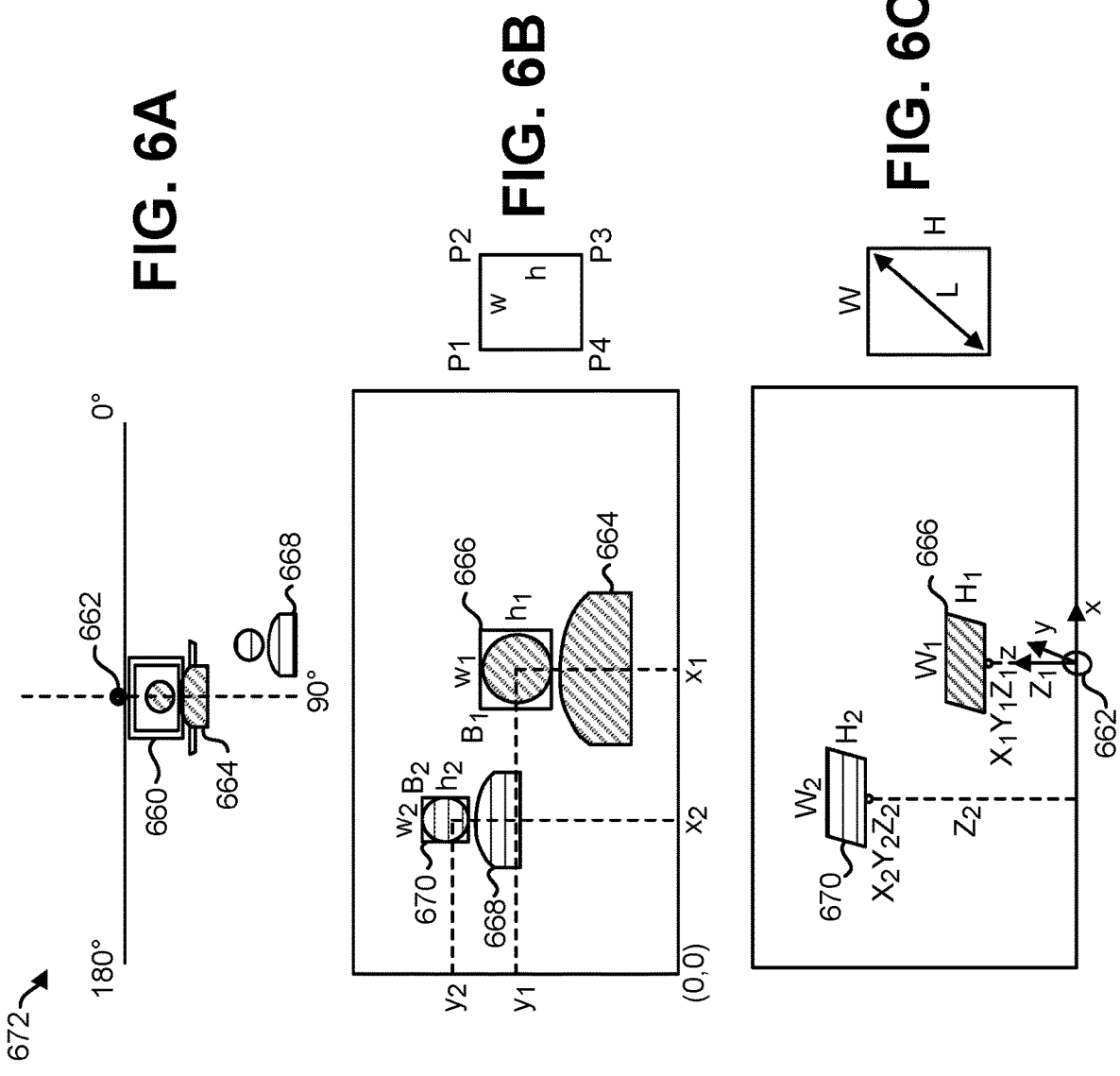
FIG. 6A is a diagram illustrating an example of an environment.
FIG. 6B is a diagram illustrating an example of an image with detected bounding boxes.
FIG. 6C is a diagram illustrating a top-down perspective view of the bounding boxes in camera coordinates.

FIG. 6A is a diagram illustrating an example of an environment 672. FIG. 6A is illustrated in terms of degrees from a lateral axis intersecting a camera 662 (e.g., image sensor). FIG. 6B is a diagram illustrating an example of an image with detected bounding boxes 666, 670. FIG. 6B is illustrated in units of pixels. FIG. 6C is a diagram illustrating a top-down perspective view of the bounding boxes 666, 670 in camera coordinates. FIGS. 6A, 6B, and 6C will be described together.

In this example, a camera 662 may capture an image of a first person 664 and a second person 668. The image may be provided to an electronic device 660. The electronic device 660 may be an example of the electronic device 102 described in FIG. 1. The electronic device may utilize a machine learning model (e.g., second machine learning model 110, neural network, etc.) to detect the first bounding box 666 corresponding to the first person 664 (e.g., user) and the second bounding box 670 corresponding to the second person 668. The electronic device 660 may utilize the first bounding box 666 and the second bounding box 670 to determine a distance between the first bounding box 666 and the second bounding box 670 and/or between the first person 664 and the second person 668.

In this example, the first person 664 has a first bounding box 666 (denoted $B_1$) at a location of $(x_1, y_1)$ with width $w_1$ and height $h_1$. The second person 668 has a second bounding box 670 (denoted $B_2$) at a location of $(x_2, y_2)$ with width $w_2$ and height $h_2$.

In some examples, a distance between two persons may be determined (e.g., calculated) in accordance with some of the techniques described herein. For instance, with the first bounding box 666 and the second bounding box 670 detected in an image (e.g., one video frame), a camera pinhole or projective model may be used for each bounding box corner with corresponding 2D and three-dimensional (3D) coordinates. The camera pinhole or projective model may be expressed as shown in Equation (1) and (2).

$$\frac{X}{Z} = \frac{x - cx}{f} \tag{1}$$

$$\frac{Y}{Z} = \frac{y - cy}{f} \tag{2}$$

In Equation (2), (X, Y, Z) are 3D camera coordinates of a location, (x, y) are 2D image coordinates of a point or pixel location, f is a camera focal length (e.g., intrinsic focal length, which may be determined through calibration), and (cx, cy) are x and y coordinates for a principal point (e.g., a point on an image plane where a center perspective is projected).

To estimate the distance with reduced error, a bounding box diagonal length L may be used, as the length may average the variations in a human face width W and face height H with a smaller variation ratio. In some examples, W and H may be calculated from four points of a 2D bounding box, P1, P2, P3, P4, which are points in clockwise order with P1 at a top left corner. For example, the electronic device 660 may calculate L in accordance with Equation (3), and may calculate W and H in accordance with Equation (4).

$$L = \sqrt{W * W + H * H} \tag{3}$$

$$W = X_{P2} - X_{P1}, H = Y_{P3} - Y_{P2} \tag{4}$$

In Equation (4), $X_{P1}$ is an x-coordinate at P1, $X_{P2}$ is an x-coordinate at P2, $Y_{P2}$ is a y-coordinate at P2, and $Y_{P3}$ is a y-coordinate at P3.

In 3D camera coordinates, assuming that the first person 664 and the second person 668 have approximately the same face length L and combining the two bounding boxes 666, 670 in 2D coordinates and using the camera pinhole model, a relative distance $Z_2/Z_1$ or a ratio may be calculated in accordance with Equation (5).

$$\frac{Z_1}{Z_2} = \frac{\sqrt{w_2 * w_2 + h_2 * h_2}}{\sqrt{w_1 * w_1 + h_1 * h_1}} \tag{5}$$

In Equation (5), w denotes face width and h denotes face height, where a subscript 1 denotes a first bounding box 666 and a subscript 2 denotes a second bounding box 670. In 2D image coordinates, the face width w and height h may be expressed in accordance with Equation (6).

$$w = x_{P2} - x_{P1}, h = y_{P3} - y_{P2} \tag{6}$$

Once the ratio $k = Z_2/Z_1$ is estimated, (e.g., $Z_2 = 2.5 \times Z_1$), the X distance $\Delta X$ may be calculated based on $\Delta x$ in 2D coordinates using a calculated x-coordinate midpoint xm of bounding box B1 and B2 ($B_{1 \times m}$ and $B_{2 \times m}$) in accordance with Equation (7), Equation (8), Equation (9), Equation (10), Equation (11), and/or Equation (12), where $B_{1 \times P1}$ is an x-coordinate of P1 for B1, $B_{1 \times P2}$ is an x-coordinate of P2 for B1, $B_{2 \times P1}$ is an x-coordinate of P1 for B2, and $B_{2 \times P2}$ is an x-coordinate of P2 for B2.

$$\text{Let } B_{2xm} = \frac{B_{2xP2} + B_{2xP1}}{2}, B_{1xm} = \frac{B_{1xP2} + B_{1xP1}}{2} \tag{7}$$

$$X_2 = \frac{k * Z_1 * (B_{2xm} - cx)}{f} \tag{8}$$

$$X_1 = \frac{Z_1 * (B_{1xm} - cx)}{f} \tag{9}$$

So $\Delta X$ may be expressed as:

$$\Delta X = X_2 - X_1 = \frac{(k * (B_{2xm} - cx) - (B_{1xm} - cx)) * Z_1}{f} \tag{10}$$

And $\Delta Y$ may be calculated similarly by determining $B_{2ym}$ and $B_{1ym}$, where ym is a calculated y-coordinate midpoint for bounding box B1 and B2:

$$\Delta Y = Y_2 - Y_1 = \frac{(k * (B_{2ym} - cy) - (B_{1ym} - cy)) * Z_1}{f} \quad (11)$$

$$\Delta Z = Z_2 - Z_1 = (k - 1) * Z_1 \quad (12)$$

The Euclidian distance D between the first person 664 (e.g., first bounding box 666) and the second person 668 (e.g., second bounding box 670) may be determined in accordance with Equation (13):

$$D = \sqrt{\Delta X * \Delta X + \Delta Y * \Delta Y + \Delta Z * \Delta Z} \quad (13)$$

In some examples, the Euclidean distance between the first person 664 (e.g., first bounding box 666) and the second person 668 (e.g., second bounding box 670) may be expressed as a mathematic term that is a constant multiplied by $Z_1$, the distance from the camera 662 to the first person 664 (e.g., first bounding box 666).

In some examples, a horizontal angle $\alpha$ between the first person 664 (e.g., first bounding box 666) and the second person 668 (e.g., second bounding box 670) may be calculated from triangulation in accordance with Equation (14):

$$\sin \alpha = \frac{\Delta X}{\Delta Z} \quad (14)$$

In some examples, The $Z_1$ dependent distance and/or the angle $\alpha$ calculated from triangulation may be used to determine the noise suppression level (e.g., ratio).

Some examples of the techniques described herein may provide a feature or features as follows. Some examples may provide for noise suppression control based on optical (e.g., video) inferencing. Some examples may provide a two-stage machine learning approach that classifies the environment (e.g., office or non-office) first, and then detects user and/or background activities. Some examples may provide inferencing of a child's engagement change in front of the camera in a classified home office: in a central portion of the image with a size threshold or away from the camera based on training of a neural network model on labelled images of multiple persons including a child in the scene. Some examples may provide detection and/or inferencing of a pet's activities in the background in a classified home office: being distant from the user, close to the user, or sitting on the user's lap, based on training of a neural network model on labelled images of persons with a pet in the scene. Some examples may provide an electronic device and/or apparatus to perform full noise suppression, partial suppression, or no noise suppression based on a second person's or object's relative location to a user, which may reduce distortion and/or enhance sound quality of an audio signal from a microphone. Some examples may provide detection of a second person in a background zone to suppress the second person's conversation. Some examples may detect and/or suppress (e.g., reduce) environment-specific noise for non-office environments with a designated noise suppression ratio or ratios (e.g., 50% in a laundry room or on an airplane).

Some examples of the techniques described herein may be able to solve k for $Z_2 = k * Z_1$. In camera coordinates, with a focal length f and a principal point (cx, cy), a 3D/2D coordinate relationship of X, Y, Z and x, y may be established. A relative distance and/or angle between bounding boxes may be calculated (based on an assumption of normalized diagonal length L, for instance). The relative distance and/or angle may be utilized to determine a noise suppression level. In some examples, classification and detection may be performed in two stages. For instance, a first stage may include classifying an environment (e.g., office environment or other environment, etc.). In some examples, a second stage may include inferencing different scenarios (e.g., activities, a person in a background zone, an animal (dog, cat, etc.) in a background zone, a person in a foreground zone, an animal in a foreground zone, and/or a scenario when a person or animal is no longer detected (leaves or walks away)). In some examples, a second person or animal may be detected with corresponding spatial distance including location and/or direction relative to a first person (e.g., user).

As used herein, the term "and/or" may mean an item or items. For example, the phrase "A, B, and/or C" may mean any of: A (without B and C), B (without A and C), C (without A and B), A and B (without C), B and C (without A), A and C (without B), or all of A, B, and C.

While various examples are described herein, the described techniques are not limited to the examples. Variations of the examples are within the scope of the disclosure. For example, operations, aspects, and/or elements of the examples described herein may be omitted or combined.

The invention claimed is:

1. An electronic device, comprising:
   a processor to:
   classify, using a first machine learning model that is to assign a probability to each of a set of environments, the environment with a greatest probability from the set of environments based on video of the environment to produce a classification;
   detect, using a second machine learning model, a situation in the environment based on the video to produce a detection, the situation indicating a first bounding box location and a second bounding box location and includes determining a distance between the first bounding box location and the second bounding box location using a relative distance bounding box diagonal length for each bounding box, each bounding box diagonal length being an average variation of a corresponding bounding box width and height; and
   control noise suppression, with a noise suppressor using frequency-based filtering, spectral subtraction, linear time invariant filtering, machine learning based noise suppression, or beamforming, on audio captured from the environment based on the classification and the detection.

2. The electronic device of claim 1, wherein the situation indicates a location relationship between a first person and a second person or animal.

3. The electronic device of claim 2, wherein the location relationship indicates a first case that the first person is in a first zone and the second person is in a second zone, a second case that the first person is in the first zone and the animal is in the second zone, a third case that the first person and the second person are in the first zone, or a fourth case that the first person and the animal are in the first zone, wherein the first zone is nearer to a camera than the second zone.

4. The electronic device of claim 3, wherein the processor is to control the noise suppression to a first noise suppression level for the first case or the second case, or to a second noise suppression level for the third case or the fourth case, wherein the first noise suppression level is greater than the second noise suppression level.

5. The electronic device of claim 4, wherein the processor is to detect, using the second machine learning model, a second situation after the situation, wherein the second situation indicates that the first person is alone.

6. The electronic device of claim 5, wherein the processor is to control the noise suppression to a third noise suppression level that is between the first noise suppression level and the second noise suppression level in response to detecting the second situation after the situation.

7. The electronic device of claim 3, wherein the first zone is less than or equal to one meter from a camera and the second zone is greater than one meter from the camera.

8. The electronic device of claim 1, wherein the situation indicates the first bounding box location of a first person and the second bounding box location of a second person or animal.

9. The electronic device of claim 1, wherein the processor is to control the noise suppression based on the distance.

10. The electronic device of claim 1, wherein the processor is to generate a dataset to train one or more of the first machine learning model or the second machine learning model by performing data augmentation to augment an image, the data augmentation comprising one or more of geometrical transformation or color shifting.

11. The electronic device of claim 1, wherein one or more of the first machine learning model or the second machine learning model evaluate a loss function to determine weight adjustments that adjust classifying one or more of the environment or situation in the video.

12. An apparatus, comprising:
a processor to:
    determine whether video from a camera indicates an office using a first machine learning model;
    determine a scenario that indicates a location relationship by establishing a distance between a first bounding box location and a second bounding box location, based on the video in response to determining whether the video indicates an office;
    determine the distance between the first bounding box location and the second bounding box location based on a relative distance bounding box diagonal length for each bounding box;
    determine, with a noise suppressor using frequency-based filtering, spectral subtraction, linear time invariant filtering, machine learning based noise suppression, or beamforming, a level of noise suppression based on the scenario; and
    process an audio signal from a microphone at the level of noise suppression.

13. The apparatus of claim 12, wherein the processor is to determine the scenario using a second machine learning model in response to determining that the video indicates an office.

14. The apparatus of claim 13, wherein one or more of the first machine learning model or the second machine learning model evaluate a loss function to determine weight adjustments that adjust classifying one or more of the environment or situation in the video.

15. The apparatus of claim 12, wherein the processor is to determine a non-office setting in response to determining that the video does not indicate an office.

16. A non-transitory tangible computer-readable medium comprising instructions when executed cause a processor of an electronic device to:
    select, using a first machine learning model that is to assign probabilities to each environment in a set of environments and an image, the environment with the greatest probability from the set of environments that includes an office environment and a non-office environment;
    infer, using a second machine learning model, a situation in the environment in response to the selection;
    determine a noise suppression level, with a noise suppressor, based on the situation, the situation indicating a first bounding box location and a second bounding box location, wherein a distance between the first bounding box location and the second bounding box location is based on a relative distance bounding box diagonal length for each bounding box, the bounding box diagonal length being an average variation of a corresponding bounding box width and height; and
    perform noise suppression on an audio signal captured from the environment with the noise suppressor using frequency-based filtering, spectral subtraction, linear time invariant filtering, machine learning based noise suppression, or beamforming based on the noise suppression level.

17. The non-transitory tangible computer-readable medium of claim 16, wherein the instructions when executed cause the processor of the electronic device to infer the situation from a set of situations that includes a first situation where a person is in a first zone and an animal is in a second zone, a second situation where the person and the animal are in the first zone, and a third situation where the animal is partially within a field of view, wherein the first zone is nearer to a camera than the second zone.

18. The non-transitory tangible computer-readable medium of claim 17, wherein the instructions when executed cause the processor of the electronic device to determine a first noise suppression level for the first situation, a second noise suppression level for the second situation, and a third noise suppression level for the third situation, wherein the first noise suppression level is lower than the second noise suppression level, and wherein the third noise suppression level is between the first noise suppression level.

19. The non-transitory tangible computer-readable medium of claim 16, wherein the processor is to indicate a location relationship by establishing a first zone and a second zone relative to a camera, and the first and second zones are based on a region of the environment, a region in an image of the environment, or both.

\* \* \* \* \*